A. KABURECK.
GASOLENE MOTOR TRUCK.
APPLICATION FILED MAY 29, 1908.
927,729.
Patented July 13, 1909.
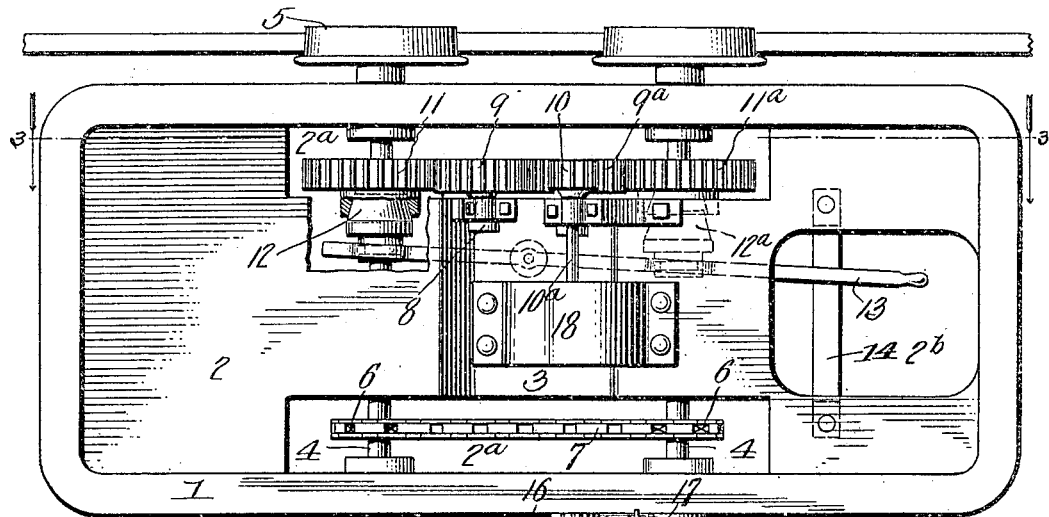
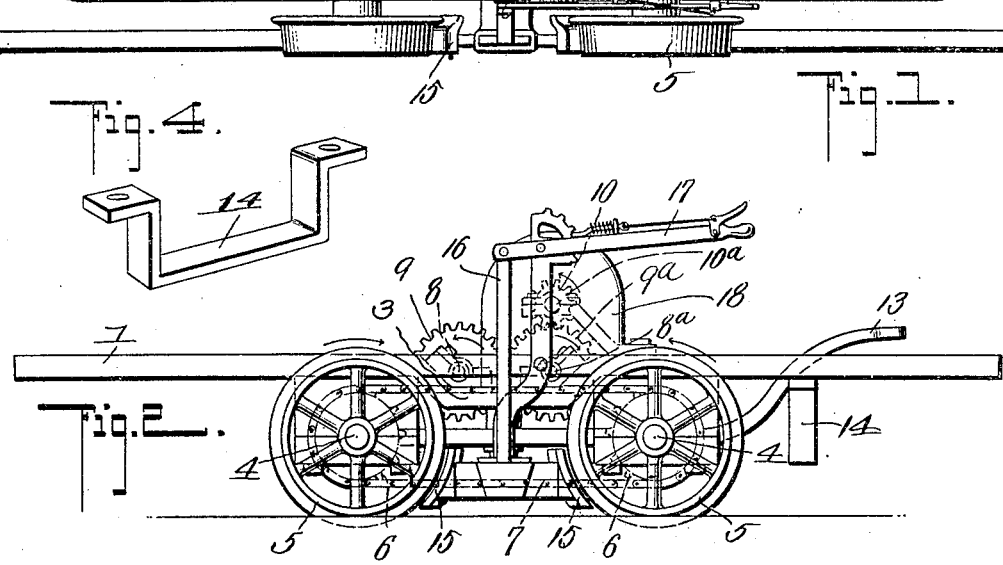
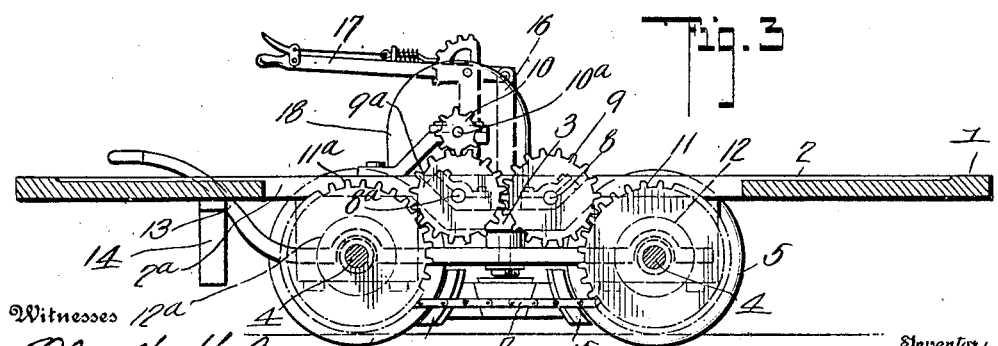

UNITED STATES PATENT OFFICE.

ANDREW KABURECK, OF ALTON, ILLINOIS.

GASOLENE-MOTOR TRUCK.

No. 927,729.  Specification of Letters Patent.  Patented July 13, 1909.

Application filed May 29, 1908. Serial No. 435,738.

*To all whom it may concern:*

Be it known that I, ANDREW KABURECK, a citizen of the United States, residing at Alton, in the county of Madison and State of Illinois, have invented a new and useful Improvement in Gasolene-Motor Trucks, of which the following is a specification.

This invention relates to a truck designed especially for a motor truck upon which may be mounted a gasolene engine and preferably, but not necessarily, provided with truck wheels.

The object of this invention is a truck on which the driving mechanism is compactly mounted and which can be readily reversed.

The invention consists of the novel features of construction hereinafter described, pointed out in the claims, and shown in the accompanying drawings, in which—

Figure 1 is a plan view of the truck and drive mechanism. Fig. 2 is a side elevation. Fig. 3 is a section on the line 3—3 of Fig. 1. Fig. 4 is a perspective view of a foot rest.

In these drawings I have omitted the vehicle or car body which may be mounted upon said truck and it will be obvious that this truck can be used in connection with either passenger or freight cars or motor wagons of any kind suitable to be mounted upon such a truck, and it will be further obvious that in the case of a car or wagon having a very long body, two of these trucks may be employed in connection with it, or the truck shown by me may be used to support one end of said car and an ordinary supporting or pilot truck used at the other end.

My truck consists of a substantially rectangular frame 1 formed of a heavy metal beam upon which is mounted a platform 2 cut out upon opposite sides as shown at $2^a$ and adjacent one end as shown at $2^b$. The central portion of this platform is sunken or depressed at 3. The frame 1 and platform 2 are supported upon suitably rotatable axles 4 which are provided with supporting wheels 5. Upon the axles 4 are placed in alinement with each other sprocket wheels 6 over which runs a sprocket chain 7, the cut-out portion of platform 2 at one side affording room for the sprocket wheels and chain.

Journaled transversely across the platform 2 and in the sunken portion 3 are parallel shafts 8 and $8^a$ upon end portions of which are mounted intermeshing idle gear wheels 9 and $9^a$, and above the shaft $8^a$ is mounted a shaft $10^a$ which carries a drive pinion 10 meshing with the gear wheel $9^a$.

Upon the axles 4 are loosely mounted gear wheels 11 and $11^a$, which mesh respectively at all times with the gear wheels 9 and $9^a$. Sliding upon the axles 4 are cone-friction clutches 12 and $12^a$ engaging operative portions of the hubs of the gear wheels 11 and $11^a$. These clutches are thrown into and out of engagement with their respective gear wheels by means of a lever 13 which is pivoted at a point midway between the two friction clutches so that when the clutch 12 is operatively in engagement with the gear wheel 11 the clutch $12^a$ is out of engagement with the gear wheel $11^a$. These clutches are suitably keyed to the axles 4. The lever 13 at its free end is curved upwardly and projects through the opening $2^b$ so that it will be within convenient reach of the operator, whose seat may be mounted above or adjacent said opening.

Suitable brakes 15 are hung between the wheels 5 upon one side of the truck and are lifted vertically to bring the brake shoes into engagement with said wheels by means of a bar 16 to which is pivotally connected a brake lever 17.

I have also shown in conventional form the outline of a gasolene engine 18, or other motor, connected direct to the shaft $10^a$.

It will be obvious that the pinion $10^a$ will drive the gear $9^a$ continuously in one direction which will in turn drive the gear wheel $11^a$ in the same direction as that of the pinion $10^a$, the gear wheel $9^a$ meshing with the gear wheel 9 will drive the same also in the same direction, as the pinion $10^a$ and the gear wheel 9 meshing with the gear wheel 11 will drive the same in the opposite direction. It will be obvious, therefore, that the gears 11 and $11^a$ will continuously rotate in opposite directions to each other and by shifting the clutches 12 and $12^a$ either the gear wheel 11 or $11^a$ may be locked to its respective axle 4 and the truck driving either forward or backward. A foot rest 14 extends across the opening $2^b$.

Having thus fully described my invention, what I claim as new and desire to secure by Letters Patent, is:—

1. A truck comprising a rectangular frame, a platform carried thereby having a sunken portion, supporting shafts carried by said truck, wheels thereon, gear wheels loosely mounted upon said shafts, said gear wheels rotating in opposite directions, clutches upon the shafts for locking said gears to the shafts, a lever operatively connected to said clutches and shifting them in opposite directions, said lever extending upwardly through the platform, shafts mounted in the sunken portion of the platform, gear wheels carried by said shafts and meshing respectively with the gear wheels first mentioned, a pinion meshing with one of the second mentioned gear wheels, said second mentioned gears intermeshing, and means for driving said pinion in one direction.

2. A truck comprising a rectangular frame, a platform carried by said frame, said platform being cut out on opposite sides, and at one end, wheels upon said shafts, sprocket wheels upon said shafts, a chain running over said sprocket wheels, said sprocket wheels and chain working in one of said openings of the platform, a drive gear mechanism working in the opening upon the opposite side, and a reverse lever operatively connected to the drive mechanism and extending upwardly through the end opening, said platform having a central sunken portion, as and for the purpose set forth.

ANDREW KABURECK.

Witnesses:
 RALPH J. JOHNSTONE,
 ARCHIE L. STUPPERICH.